(12) United States Patent
Meschkat

(10) Patent No.: US 9,307,033 B1
(45) Date of Patent: Apr. 5, 2016

(54) SCHEDULING ALERTS BASED ON CALENDAR AND LOCATION

(71) Applicant: Google Inc., Mountain View, CA (US)

(72) Inventor: Steffen Meschkat, Zurich (CH)

(73) Assignee: GOOGLE INC., Mountain View, CA (US)

( * ) Notice: Subject to any disclaimer, the term of this patent is extended or adjusted under 35 U.S.C. 154(b) by 283 days.

(21) Appl. No.: 13/970,982

(22) Filed: Aug. 20, 2013

(51) Int. Cl.
*G06F 15/16* (2006.01)
*H04L 29/08* (2006.01)
*H04L 12/58* (2006.01)

(52) U.S. Cl.
CPC .............. *H04L 67/18* (2013.01); *H04L 51/20* (2013.01); *H04L 67/26* (2013.01)

(58) Field of Classification Search
CPC ........... H04W 4/20; H04W 4/02; H04W 4/18; H04L 67/26; H04L 67/04; H04L 67/306; G08B 1/08; G08B 21/24; H04M 1/72566; H04M 1/72572; H04M 2250/10
USPC ......................................... 709/201, 206, 207
See application file for complete search history.

(56) References Cited

U.S. PATENT DOCUMENTS

| | | | |
|---|---|---|---|
| 8,054,180 B1 * | 11/2011 | Scofield et al. | 340/539.13 |
| 8,090,780 B2 | 1/2012 | Almas et al. | |
| 2004/0207522 A1 * | 10/2004 | McGee et al. | 340/539.13 |
| 2010/0093371 A1 * | 4/2010 | Gehrke et al. | 455/456.2 |
| 2012/0136572 A1 * | 5/2012 | Norton | 701/465 |
| 2013/0031169 A1 * | 1/2013 | Axelrod et al. | 709/204 |
| 2013/0217366 A1 * | 8/2013 | Kolodziej | 455/414.1 |
| 2013/0329527 A1 * | 12/2013 | Alavala et al. | 368/10 |

* cited by examiner

*Primary Examiner* — Cheikh Ndiaye
(74) *Attorney, Agent, or Firm* — Young Basile Hanlon & MacFarlane P.C.

(57) ABSTRACT

A method of scheduling alerts based on location-based reminders and calendar events includes receiving, at one or more computing devices, a location-based reminder including a reminder location having a reminder proximity level. The method further includes receiving, at the one or more computing devices, a calendar event including a calendar event location and a calendar event duration. If the reminder location matches the calendar event location based on the reminder proximity level and the calendar event duration, the method further includes determining, using the one or more computing devices, a time to provide an alert.

20 Claims, 4 Drawing Sheets

SCHEDULING ALERTS BASED ON CALENDAR AND LOCATION

BACKGROUND

The disclosure relates generally to scheduling of alerts based both on location-based reminders and the timing and duration of calendar events.

In many location-based reminder systems, the reminders are tied only to a specific geographic point. The reminders in these systems are configured to provide an alert to a user of the system when the user is currently present at the location associated with the reminder or in the vicinity of the location as determined by a previously specified radius. Often, the timing of the reminder is not convenient or appropriate given the subject matter of the reminder or the amount of time it would take the user to complete the task suggested by the reminder. Thus, users are not provided with an opportunity to act on the location-based reminder other than to dismiss the reminder.

SUMMARY

The disclosure relates to methods for scheduling alerts based on a user's calendar and location-based reminders.

One aspect of the disclosed embodiments is a method that includes receiving, at one or more computing devices, a location-based reminder. The location-based reminder includes a reminder location having a reminder proximity level. The method further includes receiving, at the one or more computing devices, a calendar event. The calendar event includes a calendar event location and a calendar event duration. If the reminder location matches the calendar event location based on the reminder proximity level and the calendar event duration, the method further includes determining, using the one or more computing devices, a time to provide an alert.

Another aspect of the disclosed embodiments is a non-transitory storage medium including program instructions executable by one or more processors that, when executed, cause the one or more processors to perform operations. The operations include receiving a location-based reminder including a reminder location having a reminder proximity level and receiving a calendar event including a calendar event location and a calendar event duration. If the reminder location matches the calendar event location based on the reminder proximity level and the calendar event duration, the operations further include determining a time to provide an alert.

Another aspect of the disclosed embodiments is an apparatus that includes one or more processors and one or more memory devices for storing program instructions used by the one or more processors. The program instructions, when executed by the one or more processors, cause the one or more processors to: receive a location-based reminder including a reminder location having a reminder proximity level and receive a calendar event including a calendar event location and a calendar event duration. If the reminder location matches the calendar event location based on the reminder proximity level and the calendar event duration, the one or more processors determine a time to provide an alert.

BRIEF DESCRIPTION OF THE DRAWINGS

The description herein makes reference to the accompanying drawings wherein like reference numerals refer to like parts throughout the several views, and wherein.

DETAILED DESCRIPTION

A person's calendar can give an indication of when that person will be present at a certain location and can also include the duration of the person's presence at that location. This calendar information can be used in combination with the person's location-based reminders in an improved scheduling system. The scheduling system can determine a time to provide an alert by matching reminder locations from a person's location-based reminders to calendar event locations from that same person's calendar events. The timing for the alert can also account for the duration of the calendar event, the duration of the reminder event, the geographic distance between the calendar event location and the reminder location, and/or information specific to the reminder location or a reminder contact. Thus, the timing of the alert for a given location-based reminder is optimized such that the person using the scheduling system is provided an opportunity to act on the reminder.

Figure 1:
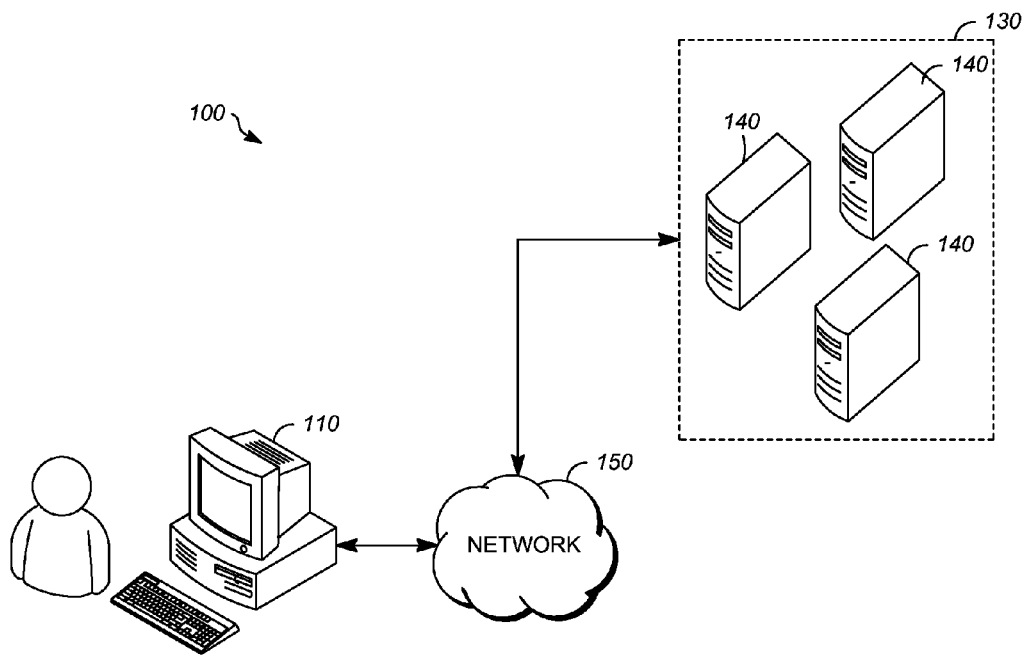
FIG. 1 is a block diagram showing an example of a system for scheduling calendar and location-based alerts.

FIG. 1 is a block diagram showing an example of an environment 100 in which a system for scheduling calendar and location-based alerts can be implemented. The environment 100 can include a user system 110 and a scheduling system 130. The user system 110 is representative of a large number (e.g. millions) of user systems that can be included in the environment 100. The user system 110 can be any manner of computer or computing device, such as a desktop computer, a laptop computer, a tablet computer, or a smart-phone (a computationally-enabled mobile telephone). The scheduling system 130 can be implemented using one or more server computers 140. The user system 110 and the scheduling system 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The scheduling system 130 provides a scheduling service to the user system 110. In some implementations, all of the operations described here with respect to scheduling calendar and location-based alerts are performed at the scheduling system 130. In other implementations, some of the operations described here are performed at the scheduling system 130, and the other operations are performed at the user system 110.

Figure 2:
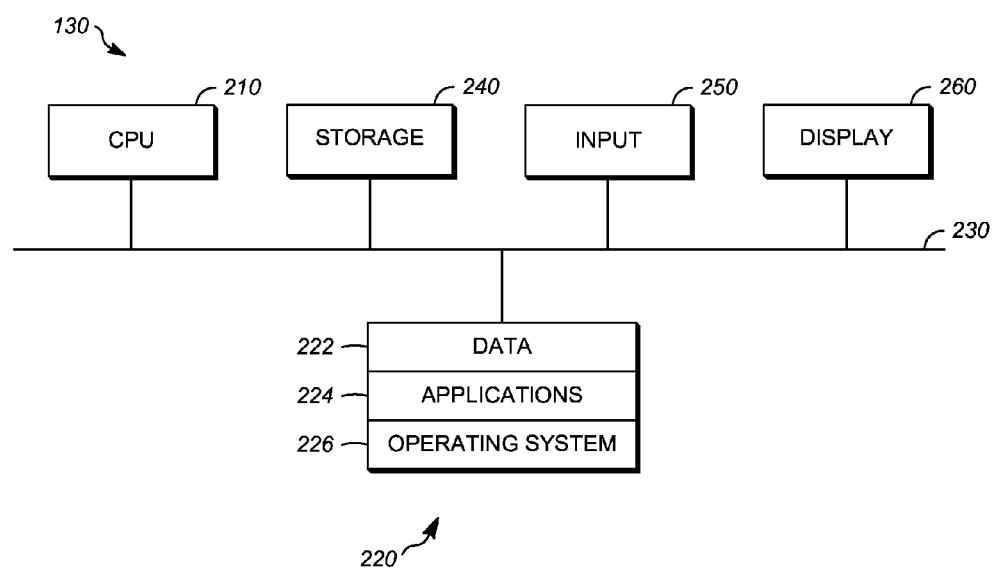
FIG. 2 is a block diagram showing an example of a server computer.

FIG. 2 is a block diagram of an example of a hardware configuration for the one or more server computers 140. The same hardware configuration or a similar hardware configuration can be used to implement the user system 110. Each server computer 140 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 140 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disk drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 2 depicts the CPU 210 and the memory 220 of each server computer 140 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each server computer 140 can be composed of multiple buses. Further, the storage device 240 can be directly coupled to the other components of the respective server computer 140 or can be accessed via a network and can comprise a single integrated unit such as a memory card or multiple units such as multiple memory cards. The one or more server computers 140 can thus be implemented in a wide variety of configurations.

Figure 3:
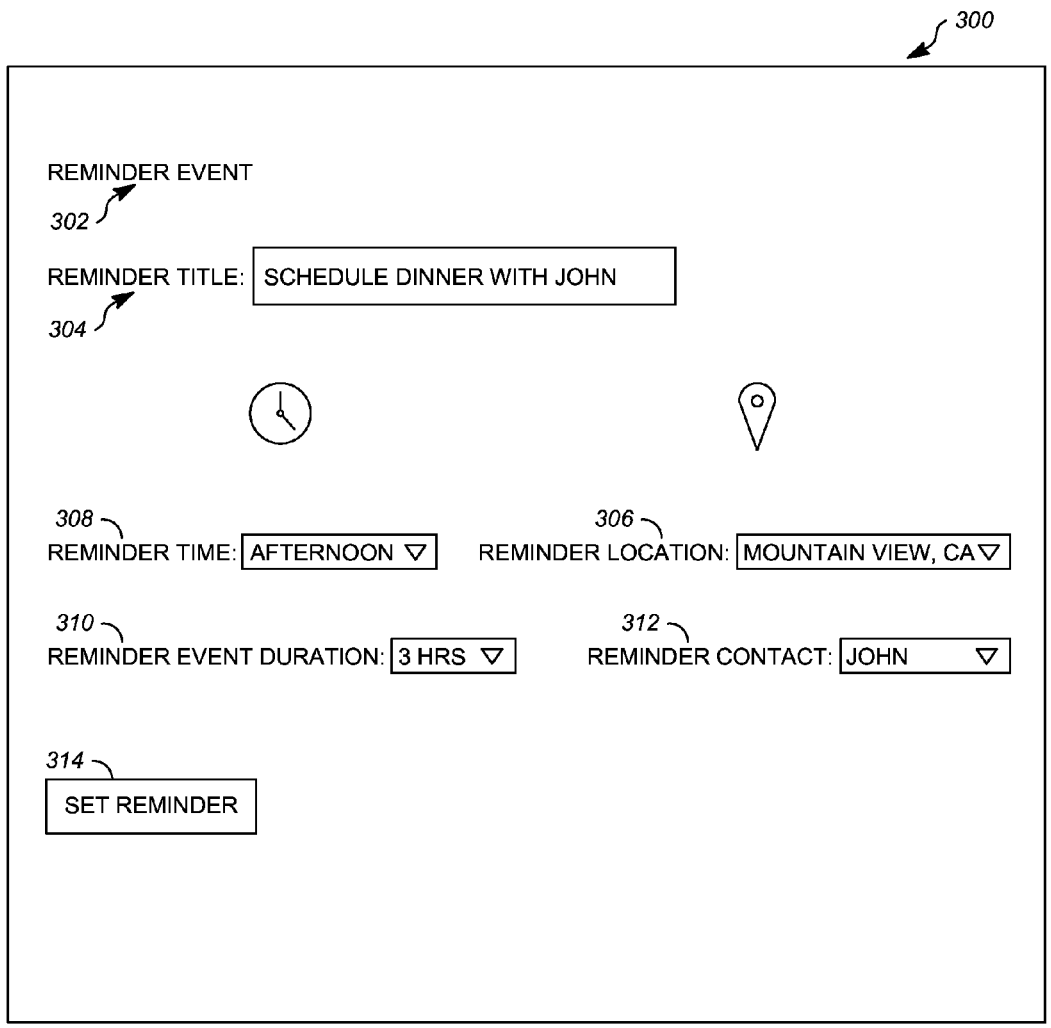
FIG. 3 is an illustration showing an example reminder interface for entering location-based reminders.

FIG. 3 is an illustration showing an example reminder interface 300 for entering location-based reminders. Each location-based reminder can be entered, for example, at the user system 110. The relevant details associated with the location-based reminder can be entered by the user in the form of a reminder event 302. The reminder event 302 displayed on the reminder interface 300 includes information fields having user entry and/or drop-down selection configurations. The information fields can include a reminder title field 304, a reminder location field 306, a reminder time field 308, a reminder event duration field 310, and a reminder contact field 312. The reminder interface 300 can also include a soft button 314 for saving the reminder event 302 to the scheduling system 130 after the information fields have been partially or fully completed.

The reminder title field 304 can be populated with information related to the type of reminder event 302 being created. For example, the text "Schedule Dinner with John" can be entered by the user into the reminder title field 304 to denote that this reminder event 302 is designed to remind the user to contact a friend or colleague named John to set up some dinner plans. Other example entries into the reminder title field 304 can include such text as "Pick up Milk," "Visit the Aquarium," etc. Any text useful for reminding the user to perform a task can be entered into the reminder title field 304. The scheduling system 130 can also be configured to populate other information fields based on the text entered into the reminder title field 304. For example, by using "John" in the reminder title field 304, the scheduling system 130 could be configured to suggest one or more of the user's phone or e-mail contacts named John for population of the reminder contact field 312.

The reminder location field 306 can be populated with information denoting the specific or general location serving as the basis for providing an alert related to the location-based reminder. The reminder location can be a geographic location, such as a city or geo-spatial coordinates, or it can be a specific place, such as a museum, restaurant, or retail store. If the reminder location field 306 is populated with a specific place, the scheduling system 130 can determine additional relevant information about the reminder location, such as operating hours, address, contact information, etc. for use within the other information fields in the reminder event 302. For example, daytime operating hours associated with a museum listed as the reminder location could be used by the scheduling system 130 to suggest "Morning" for populating in the reminder time field 308.

In the example shown for reminder event 302, the user entered "Mountain View, Calif." in the reminder location field 306 to indicate that the dinner with John should be scheduled when the user is scheduled to be in or near the city of Mountain View. In another example, the reminder location field 306 can be specified implicitly. For example, the reminder location field 306 can be populated by the scheduling system 130 based on the contact selected by the user in the reminder contact field 312 or based on the calendar of the contact in the reminder contact field 312. That is, the scheduling system 130 can use information related to the contact in either the user's system 110, e.g. a contact information card, or the contact's system, e.g. the contact's calendar or schedule if permissions allow it, to populate the reminder location field 306 with a location associated with the contact. In another example, if the reminder event 302 is related to purchasing an item, the scheduling system 130 can determine a location at which the item can be purchased for population of the reminder location field 306 based on a location database. The location database can be publicly available (e.g., shared between many users) or specific to the user in the form, for example, of the user's address book.

A reminder location can be associated with a reminder proximity level by the scheduling system 130. For example, the reminder proximity level can be a geo-fence having a predetermined perimeter. The predetermined perimeter can be based on the level, that is, the specificity or granularity, of the location in the reminder location field 306. Various predetermined perimeters can include countries, regions, states, provinces, counties, cities, towns, neighborhoods, or point locations, each of these perimeters serving as non-limiting examples of reminder proximity levels.

In the example shown in FIG. 3, the location "Mountain View, Calif." corresponds to a reminder proximity level having a geographic perimeter based on the limits of the city of Mountain View. Given this perimeter, the reminder event 302 can be configured to provide an alert to the user when the user is in or near these city limits. In another example, the location entered into the reminder location field 306 could be "San Francisco Bay Area" corresponding to a regional reminder proximity level, expanding the geographic perimeter for the location-based reminder to include several cities such as Palo Alto, Calif., San Francisco, Calif., and Mountain View, Calif. as sufficient to trigger an alert associated with the reminder event 302. The reminder location field 306 and its corresponding reminder proximity level become important when comparing the reminder event 302 to a calendar event as described below.

The reminder time field 308 can be populated by the user with a preferential time to receive an alert. For example, the user can set a preference to be reminded in the "Afternoon" to contact John to set dinner plans using the reminder time field 308. The scheduling system 130 can use this reminder time when determining a time to provide an alert to the user based on the reminder event 302 and the calendar event as described below. The reminder time field 308 can also be populated by the scheduling system 130 directly based on text entered in the reminder title field 304, previous reminder events created by the user, the user's calendar entries or travel patterns, etc. For example, the time "Afternoon" could have been populated in the reminder time field 308 by the scheduling system 130 based on the text "Dinner" being present in the reminder title field 304 indicating an evening meal. Since the alert associated with the "Dinner" reminder event 302 would preferably need to be received by the user before the event is to take place, the "afternoon" would be an appropriate time to schedule the alert for the location-based reminder.

The reminder event duration field 310 can be populated by the user with an approximate duration needed to complete the reminder event 302. For example, the user can indicate that "Dinner with John" will require "3 Hours" of time to complete. Alternatively, the scheduling system 130 can populate the reminder event duration field 310 based on the text entered in the reminder title field 304. For example, since the reminder title field 304 includes the text "Dinner," the scheduling system 130 can populate the reminder event duration 310 field with a predetermined value associated with this text, such as 2 hours or 3 hours depending on the algorithm or user settings. The scheduling system 130 can also populate the reminder event duration field 310 based on previous similar reminder events created by the same user, based on reminder events or calendar events created by contacts of the user, or based on reminder events or calendar events created by other users handled by the scheduling system 130. Alternatively, the reminder event duration field 310 can be left blank.

The reminder contact field 312 can be populated by the user with a contact's name or other contact information when the user wishes to associate the reminder event 302 with another person. The reminder contact field 312 can also be populated by the scheduling system 130 if a contact's name or other information relevant to the contact appears in the text entered into the reminder title field 304. As described above, the reminder contact field 312 can also be used by the scheduling system 130 to populate the reminder location field 306. Finally, the soft button 314 can be used to save or enable the reminder event 302 once one or more of the information fields has been populated. Once a reminder event 302 is saved or enabled, the scheduling system 130 can store the reminder event 302 for comparison to calendar events as described below.

Figure 4:
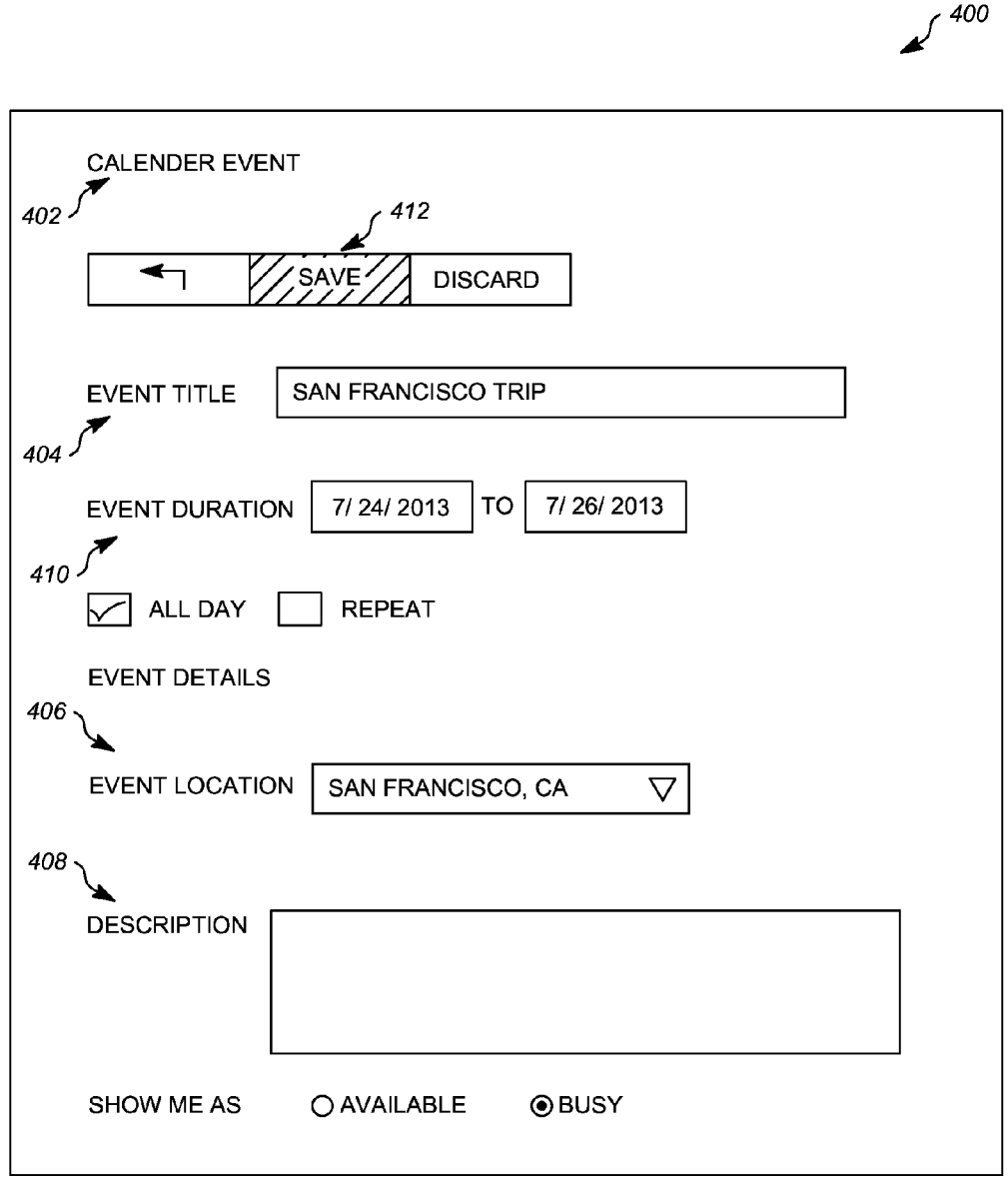
FIG. 4 is an illustration showing an example calendar interface for entering calendar events.

FIG. 4 is an illustration showing an example calendar interface 400 for entering calendar events. Each calendar event can be entered, for example, at the user system 110. The relevant details associated with calendar events can be entered by the user, with one example being shown in the form of calendar event 402. The calendar event 402 displayed on the example calendar interface 400 includes information fields having user entry and/or field selection configurations. The information fields can include a calendar event title field 404, a calendar event location field 406, a calendar event description field 408, and a calendar event duration field 410. The calendar interface 400 can also include a soft button 412 for saving the calendar event 402 to the scheduling system 130 after the information fields have been partially or fully completed.

The calendar event title field 404 can be populated with information related to the type of calendar event 402 being created. For example, the text "San Francisco Trip" can be entered by the user into the calendar event title field 404 to denote that this calendar event 402 indicates travel to San Francisco on the user's calendar. The scheduling system 130 can also be configured to populate other information fields based on the text entered into the calendar event title field 404. For example, when the text "San Francisco" in entered in the calendar event title field 404, the scheduling system 130 could be configured to suggest San Francisco, Calif. for population of the calendar event location field 406.

The calendar event location field 406 can be populated with information denoting the specific or general location of the calendar event 402. The calendar event location can be a geographic location, such as a city or geo-spatial coordinates, or it can be a specific place, such as a conference room, office of a colleague, etc. If the calendar event location field 406 is populated with a specific place, the scheduling system 130 can determine additional relevant information about the calendar event location, such as available equipment at the calendar event location, operating hours of the calendar event location, address and phone of the calendar event location, etc. for use within one or more of the other information fields in the calendar event 402. For example, a phone number associated with a conference room could be used by the scheduling system 130 to populate a portion of the calendar event description field 408.

In the example shown for calendar event 402, the user entered (or the scheduling system 130 populated) "San Francisco, Calif." in the calendar event location field 406 to indicate that the user will be traveling to the city of San Francisco in the state of California. The user can also enter additional text describing the trip to San Francisco into the calendar event description field 408. For example, the user could list reference phone numbers for hotels where the user will be staying during the trip to San Francisco. In the example calendar event 402 of FIG. 4, no additional text has been in the calendar event description field 408.

The calendar event duration field 410 can be populated by the user with the exact or the approximate duration of the calendar event 402. For example, the user can indicate that the trip to San Francisco will take place over three days, July 24th to Jul. 26, 2013. In another example where the calendar event is a meeting, the user can indicate that the meeting will last for one or two hours. Finally, the soft button 412 can be used to save the calendar event 402 to the user's calendar once at least the calendar event title field 404 and the calendar event duration field 410 have been populated. Once a calendar event 402 is saved, the scheduling system 130 can store the calendar event 402 and compare existing reminder events, such as reminder event 302, to the calendar event 402.

The comparison between the reminder event 302 and the calendar event 402 can include determining whether there's a match between the reminder location (the location listed in the reminder location field 306) and the calendar event location (the location listed in the calendar event location field 406) based on the reminder proximity level and the calendar event duration. For example, in the reminder event 302 shown in FIG. 3, the reminder event location "Mountain View, Calif." indicates a city-based reminder proximity level, that is, the user wishes to be sent an alert when in or near the city of Mountain View. In the calendar event 402 shown in FIG. 4, the calendar event location "San Francisco, Calif." indicates that the user will be traveling to a city approximately 40 miles north of Mountain View. Whether the scheduling system 130 schedules an alert for reminder event 302 given the 40 mile distance between the two cities will depend on the amount of time the user will be spending in San Francisco per the calendar event 402.

In the example shown in FIG. 4, the user will be in San Francisco for 3 days as indicated in the calendar event duration field 410. Three days is generally enough time to schedule a dinner meeting given the distance between the locations in the reminder event 302 and the calendar event 402. Hence, the reminder location can be determined to be a match for the calendar event location given the reminder proximity level (nearby/in the city perimeter) and the calendar event duration (3 days). In another example, the user could schedule a new calendar event with the calendar event location of San Francisco having a calendar event duration of 2 hours on the evening on July 24$^{th}$, from 5 pm to 7 pm. In this case, a comparison of the reminder event 302 to the new calendar event would not produce an alert based on both the distance between the cities of Mountain View and San Francisco (40 miles) and the conflict in timing of the new calendar event (5 pm-7 pm) and the reminder event 302 (afternoon reminder preference needing 3 hour duration).

When there is a match between a reminder location and a calendar event location based on the reminder proximity level and the calendar event duration, the scheduling system 130 can determine a time to provide an alert to the user. The alert can be provided, for example, in the form of a notification sent to the user at a specific time or in the form of a new calendar event being added to the user's calendar based on the reminder event 302. In the case of a new calendar event, the calendar application can notify the user of the calendar event in a manner consistent with the user's preferences for other calendar events. In the example described in respect to FIGS. 3 and 4, the scheduling system 130 can determine that the afternoon before the calendar event 402 (the trip to San Francisco) would be the time to send an alert based on the reminder event 302 (scheduling dinner with the user's colleague John). Alternatively, given the duration of the user's trip to San Francisco, the scheduling system 130 could wait to alert the user until the afternoon of the user's first full day in San Francisco, July 24$^{th}$, which would allow the user to schedule the dinner with John that same evening or the next evening. The scheduling system 130 could be configured such that the user can indicate a preference to receive alerts or notifications before matched events or during matched events, should the calendar event duration allow it.

The time determined to provide the alert can be based at least partially on the reminder time associated with the reminder event 302. For example, in reminder event 302, the reminder time entered by the user (or determined automatically by the scheduling system 130) for the location-based reminder is "Afternoon." This time preference can be one factor used by the scheduling system 130 to determine the time to provide an alert to the user. The time determined to provide the alert can also be based at least partially on the reminder event duration. For example, in reminder event 302, the reminder event duration entered by the user (or determined automatically by the scheduling system 130) for the location-based reminder is "3 hours." This reminder event duration can indicate to the scheduling system 130 that at least 3 hours of free time will need to be available on the user's calendar in order to schedule dinner with John. The scheduling system 130 can also take existing calendar events on the user's calendar into account when determining the time to provide the alert.

The time determined to provide the alert can also be based at least partially on the geographic distance between the calendar event location and the reminder event location. For example, the reminder event location for the reminder event 302 is Mountain View, Calif., which is approximately 40 miles away from San Francisco, Calif., the calendar event location in calendar event 402. Given the geographic distance between the two locations, the alert could be provided at a time that takes travel time into account, that is, the time to provide the alert would factor in that it would be necessary for the user to travel from one location to the other. Factors affecting time of travel can include distance between locations, traffic patterns, mode of transportation, etc. and the scheduling system 130 can be configured to take each of these factors into account when determining the time to provide the alert.

The time determined to provide the alert can also be based at least partially on information specific to the reminder contact listed in the reminder contact field 312. For example, in reminder event 302, the reminder contact "John" has been selected or entered by the user or populated by the scheduling system 130. When the calendar event 402 and the reminder event 302 are found to be a match, the scheduling system 130 can be configured to communicate with a stored calendar associated with the contact "John," assuming permissions are appropriate to do so, in order to find free time in the evening on John's calendar during the user's visit to San Francisco. The scheduling system 130 can then propose a time for a new calendar event that would work within both the user's calendar and John's calendar and send the calendar event invite to both John and the user shortly after the calendar event 402 is generated. This proposed calendar event can serve as the alert sent to both the user and the contact listed in the reminder contact field 312 and is provided at a convenient time as the user has just scheduled the trip to San Francisco. Once the new calendar event is available to the user, it can be rearranged or rescheduled in a manner similar to any other calendar event on the user's calendar. Further, if the new calendar event is removed, the reminder event 302 can be re-activated.

Figure 5:
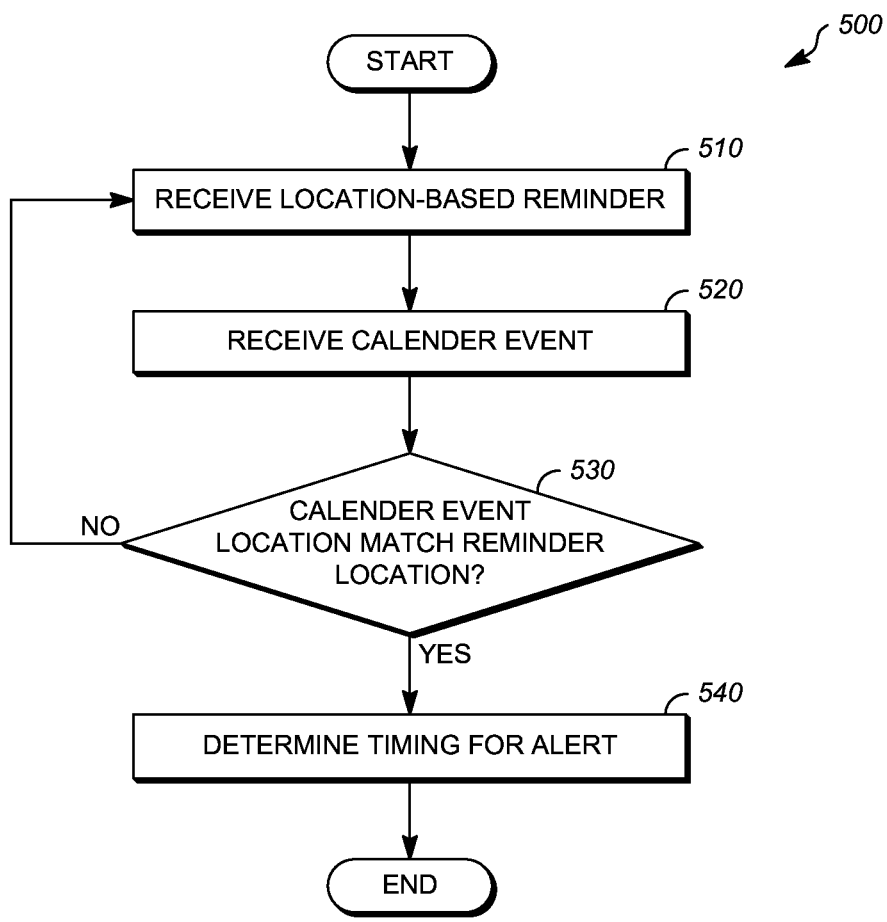
FIG. 5 is a flow chart showing an example of a process for scheduling alerts based on calendar events and location-based reminders.

FIG. 5 is a flow chart showing an example of a process 500 for scheduling alerts based on calendar events and location-based reminders. The operations described in connection with the process 500 can be performed at one or more computers, such as at the one or more server computers 140 of the scheduling system 130. As used herein, the phrases "one or more computers," "one or more computing devices," "one or more server computers," and similar phrases include all of the computers or groups of computers that participate in performing the process. For example, the process 500 can be performed at one or more computers in an implementation where each of the operations described herein is performed using a different group of computers, where each group of computers cooperatively performs the respective operation of the process 500.

When an operation is performed by one or more computers, it is completed when it is performed by one computer. The operations described in connection with the example process 500 can be embodied as a non-transitory computer readable storage medium including program instructions executable by one or more processors that, when executed, cause the one or more processors to perform the operations. For example, the operations described in connection with the example process 500 could be stored at the memory 220 of a respective one of the server computers 140 and be executable by the CPU 210 thereof.

At operation 510, a location-based reminder is received, for example, at the one or more server computers 140 of the scheduling system 130. The location-based reminder can include a reminder location having a reminder proximity level. The reminder location can be a broad, general location, e.g. "Northern California," a narrow, specific location, e.g. "Golden Gate Park, San Francisco, Calif.," or any other level of location. The reminder proximity level associated with the reminder location can be a geo-fence having a predetermined perimeter such as a country, region, state, province, county, city, town, neighborhood, or point location based on the breadth of the reminder location. The broader the reminder location, the larger the geo-fence perimeter that can be associated with the location-based reminder.

At operation 520, a calendar event is received, for example, at the one or more server computers 140 of the scheduling system 130. The calendar event can include a calendar event location and a calendar event duration. The calendar event location can be broad or narrow, for example, the calendar location can be conference room for a work meeting or a country for a vacation destination. The calendar event duration can be included in any temporal format, for example, minutes, hours, days, or weeks corresponding to a block on a user's calendar for the calendar event.

At decision block 530, the scheduling system 130 determines whether the reminder location matches the calendar event location. As described previously, the calendar event location and the reminder location can be compared using the reminder proximity level (e.g., the breadth of a geo-fence perimeter) and the calendar event duration (e.g., presence in a given location for a few hours or a few days) to determine a match. For example, a user can enter a location-based reminder to attend a Broadway show while in New York City, N.Y. The same user can schedule a calendar event for a trip to the state of New York for a period of 4 days in an upcoming month. Since the geo-fence perimeter associated with the location-based reminder will be New York City, and the user is planning to be in New York State, which includes New York City, for a period of 4 days, a sufficient period of time to see a show, the scheduling system can determine that the reminder location matches the calendar event location.

If no match is found between the reminder location and the calendar event location, the process 500 moves back to operation 510, and additional location-based reminders and calendar events can be compared by the scheduling system 130. If a match is found between the reminder location and the calendar event location, the process continues to operation 540. At operation 540, the time to provide an alert is determined, for example, at the one or more server computers 140 of the scheduling system 130. As described above, the alert can be a notification or new calendar event based on the location-based reminder. The time to provide the alert can be, for example, a time before or during the calendar event found to match to the reminder event, dependent on the duration of the calendar event and preferences set by the user of the scheduling system. The time to provide the alert can also be based on a reminder event duration specified by the user or calculated by the scheduling system, the geographic distance between the calendar event location and the reminder location, or information specific to a reminder contact, such as information on the contact's calendar. Once the timing for the alert to be delivered to the user has been determined, the process 500 ends.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method for scheduling alerts based on location-based reminders and calendar events, comprising:
   receiving, from a user computing device via a first computer communication link, a location-based reminder including a reminder location and a reminder event duration;
   determining, in response to instructions stored on a computer readable non-transitory medium, a reminder proximity level defining a geographic breadth for the reminder location;
   receiving, from the user computing device via a second computer communication link, a calendar event including a calendar event location and a calendar event duration;
   determining, in response to instructions stored on the computer readable non-transitory medium, whether the calendar event location matches the reminder location based on the reminder proximity level;
   determining, in response to instructions stored on the computer readable non-transitory medium, whether the reminder event duration is less than the calendar event duration;
   if the calendar event location matches the reminder location based on the reminder proximity level, and if the reminder event duration is less than the calendar event duration, determining, in response to instructions store on the computer readable non-transitory medium, a time to provide an alert for the location-based reminder; and
   at the determined time, providing the alert to the user computing device via a third communication link.

2. The method of claim 1, wherein the reminder proximity level is a geo-fence having a predetermined perimeter.

3. The method of claim 2, wherein the predetermined perimeter is one of a country, region, state, province, county, city, town, neighborhood, and point location.

4. The method of claim 1, wherein determining the time to provide the alert is further based on a geographic distance between the calendar event location and the reminder location.

5. The method of claim 1, wherein determining the time to provide the alert is further based on external information specific to the reminder location.

6. The method of claim 1, wherein the location-based reminder further includes a reminder contact, and determining the time to provide the alert is further based on information specific to the reminder contact.

7. The method of claim 6, wherein the location-based reminder further includes a reminder title and wherein the one or more computing devices generates one or more of the reminder location, the reminder event duration, and the reminder contact based on the reminder title.

8. The method of claim 6, further comprising:
   at the determined time to provide an alert, sending at least one of an alert and a new calendar event to the reminder contact.

9. A non-transitory storage medium including program instructions executable by one or more processors that, when executed, cause the one or more processors to perform operations, the operations comprising:
   receiving, from a user computer device via a first computer communication link, a location-based reminder including a reminder location and a reminder event duration;
   determining a reminder proximity level defining a geographic breadth for the reminder location;
   receiving, from the user computing device via a second computer communication link, a calendar event including a calendar event location and a calendar event duration;
   determining whether the calendar event location matches the reminder location based on the reminder proximity level;
   determining whether the reminder event duration is less than the calendar event duration;
   if the calendar event location matches the reminder location based on the reminder proximity level, and if the reminder event duration is less than the calendar event duration, determining a time to provide an alert for the location-based reminder; and at the determined time, providing the alert to the user computing device via a third communication link.

10. The non-transitory storage medium of claim 9, wherein the reminder proximity level is a geo-fence having a predetermined perimeter.

11. The non-transitory storage medium of claim 10, wherein the predetermined perimeter is one of a country, region, state, province, county, city, town, neighborhood, and point location.

12. The non-transitory storage medium of claim 9, wherein determining the time to provide the alert is further based on a geographic distance between the calendar event location and the reminder location.

13. The non-transitory storage medium of claim 9, wherein determining the time to provide the alert is further based on external information specific to the reminder location.

14. The non-transitory storage medium of claim 9, wherein the location-based reminder further includes a reminder contact, further comprising:

at the determined time to provide an alert, sending at least one of an alert and a new calendar event to the reminder contact.

15. A scheduling apparatus, comprising:

one or more processors; and one or more memory devices for storing program instructions used by the one or more processors, wherein the program instructions, when executed by the one or more processors, cause the one or more processors to:

receive, from a user computer device via a first computer communication link, a location-based reminder including a reminder location and a reminder event duration;

determine a reminder proximity level defining a geographic breadth for the reminder location;

receive, from the user computing device via a second computer communication link a calendar event including a calendar event location and a calendar event duration;

determine whether the calendar event location matches the reminder location based on the reminder proximity level;

determine whether the reminder event duration is less than the calendar event duration;

if the calendar event location matches the reminder location based on the reminder proximity level, and if the reminder event duration is less than the calendar event duration, determine a time to provide an alert for the location-based reminder; and at the determined time, provide the alert to the user computing device via a third communication link.

16. The apparatus of claim 15, wherein the reminder proximity level is a geo-fence having a predetermined perimeter.

17. The apparatus of claim 16, wherein the predetermined perimeter is one of a country, region, state, province, county, city, town, neighborhood, and point location.

18. The apparatus of claim 15, wherein determining the time to provide the alert is further based on a geographic distance between the calendar event location and the reminder location.

19. The apparatus of claim 15, wherein determining the time to provide the alert is further based on external information specific to the reminder location.

20. The apparatus of claim 15, wherein the location-based reminder further includes a reminder title and wherein one or more of the reminder location, the reminder event duration, and a reminder contact are generated based on the reminder title.

* * * * *